(No Model.)
F. J. FREESE.
SOLE TRIMMING MACHINE.
No. 577,738. Patented Feb. 23, 1897.
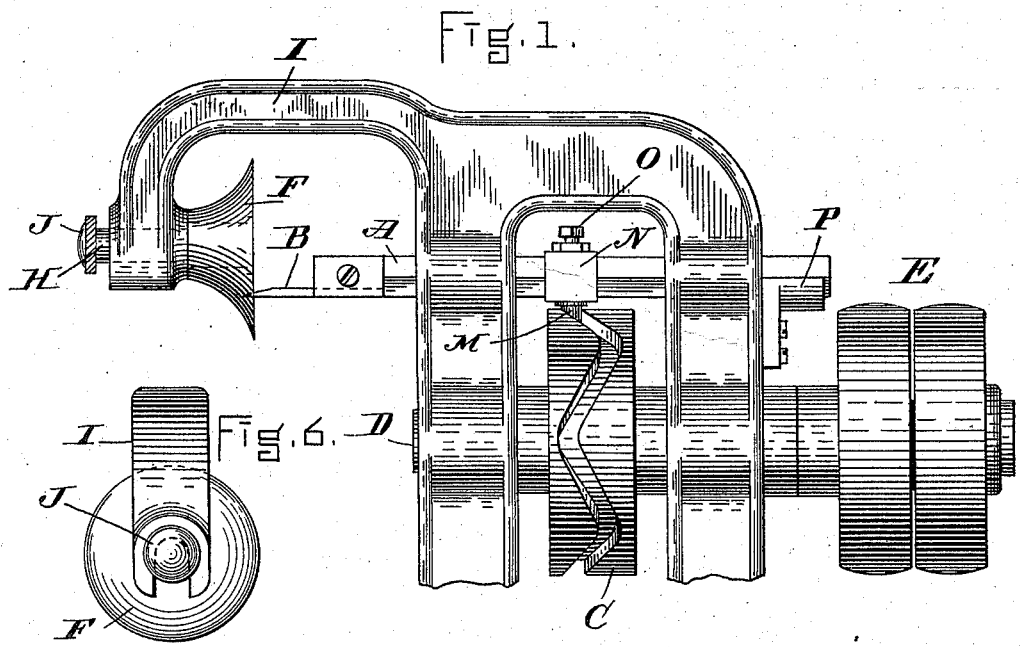
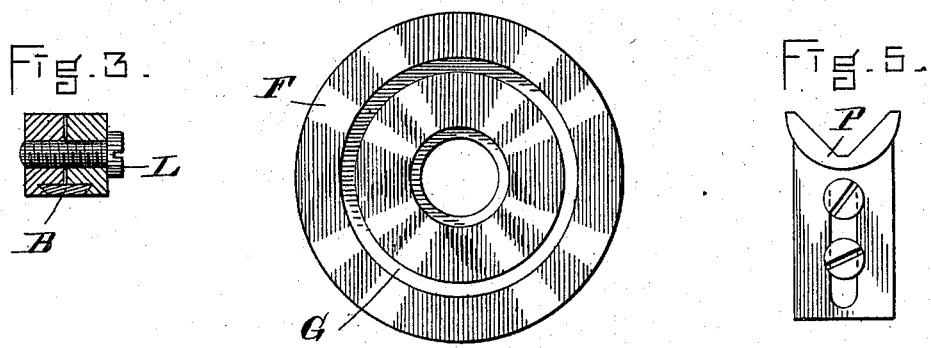
Witnesses:
Henry Marsh.
Ada W. Spencer.
Inventor:
Francis J. Freese
by his attorney
THE NORRIS PETERS CO., PHOTO-LITHO., WASHINGTON, D. C.

UNITED STATES PATENT OFFICE.

FRANCIS JOSEPH FREESE, OF LOWELL, MASSACHUSETTS.

SOLE-TRIMMING MACHINE.

SPECIFICATION forming part of Letters Patent No. 577,738, dated February 23, 1897.

Application filed February 20, 1892. Serial No. 422,182. (No model.)

*To all whom it may concern:*

Be it known that I, FRANCIS JOSEPH FREESE, of Lowell, in the county of Middlesex and State of Massachusetts, have invented certain new and useful Improvements in Sole-Trimming Machines, of which the following, taken in connection with the accompanying drawings, is a specification.

This invention is designed to furnish an improved mechanism for trimming the projecting edges of boot and shoe soles, and for other purposes where the stock or material is to be cut at a uniform distance from a given guide or form.

My invention is embodied in a suitable frame having a rotatable guide or form for the shoe to bear against, with an annular groove in the face of such guide, in combination with a reciprocating blade having its cutting-tip working within such groove and with suitable actuating mechanism.

My method of trimming by holding the shoe by hand up to a guide while the material is cut by a reciprocating blade working within a groove in the face of said guide is advantageous in various respects.

In the drawings, Figure 1 represents in elevation part of the frame of a machine constructed according to my invention. Fig. 2 is a face view of the annularly-grooved guide or form. Fig. 3 illustrates a means of holding the blade in position. Fig. 4 represents a suitably-formed blade detached, and Fig. 5 is an adjusting device for the reciprocating shaft. Fig. 6 is an end elevation of the arm.

A represents a shaft carrying at its tip a blade B, both being reciprocated longitudinally at high speed by means of the grooved cam C on the rotary shaft D, which is provided with tight and loose pulleys E to receive the driving-belt.

F is a rest form or guide mounted on a suitable stud H, upon which it is rotatable frictionally when the shoe or other article is pressed against the edge of such form or guide.

The rest form or guide has its edge beveled, as clearly shown in Fig. 1.

The tip of the blade B works with a very short reciprocating stroke in the annular groove G, formed in the face of the guide F, the edge of which fits in against the inseam between the upper and the welt of a shoe in the process of manufacture. The shoe is pressed up by hand against the rotatable rest or form F and is turned about by the operator, so that the knife by its reciprocation may operate to trim off all superfluous stock.

The face of the form stands perpendicular to the blade B, and the edge of the groove G is one constant member of the shears, the reciprocating blade being the other or movable member. The stock to be cut projects smoothly along the face of the form from its edge inwardly beyond the groove G, the cutting-line being thus at a uniform distance from such edge. This may be varied by substituting a like form with the groove nearer to or farther from the edge.

The arm I of the frame which supports the form F is shown as recessed to receive by a vertical sidewise movement the stud H, on which the form is supported, and which may have a milled nut J to hold it in position. The blade B is represented with a dovetailed shank to enter a corresponding recess between two prongs of the shaft A, where it is held by a screw L. The stud M, which fits into the cam-groove C, has a sleeve N and a set-screw O, by which it may be fixed to the shaft A or released. This shaft is supplied with angular bearings P, which may be adjustable vertically to compensate for wear.

I am aware of the patent to Packard on a machine for cutting out soles from flat stock, dated May 8, 1883, No. 277,056, where a stationary knife at the edge of a pattern protrudes through the leather into a groove formed in the periphery of the feed-wheel. My machine has no feed-wheel and no pattern. The knife reciprocates some three thousand strokes a minute, entering the circular groove in the flat face of the guide F, against the edge of which the operator presses the shoe while he turns it about by hand. Reciprocating knives have been employed in machines of various forms; but I am not aware of any such use in combination with a circular guide or form having in its flat face an annular groove at a distance from its edge equal to the desired distance of the sole edge from the inseam, the tip of the blade working within said groove. This construction is original with me and is of great utility.

I claim as my invention—

1. In a trimming-machine of the character described, the circular rest free to rotate, having a thin edge adapted to penetrate the inseam of a shoe, a beveled back and flat disk-face, and an open groove in said face parallel to and near the edge of said rest, in combination with a reciprocating blade having its lateral cutting edge working in and in shear contact with the edge of said groove, and means for supporting said parts and for reciprocating the blade, all combined substantially as described.

2. In a shoe-trimming machine, the circular rest supported to freely rotate on a central journal and having a groove in its flat face, the reciprocating knife working in a plane perpendicular to the flat face of the rest and having its lateral edge in constant shearing contact with the edge of the groove in the face of the rest, and means for reciprocating the knife, all combined substantially as described so that the shoe may be held against the rest and moved by hand, and the trimming may be done by the reciprocating knife, substantially as set forth.

In testimony whereof I have signed my name to this specification, in the presence of two subscribing witnesses, on this 22d day of January, A. D. 1892.

FRANCIS JOSEPH FREESE.

Witnesses:
HENRY BENJAMIN,
R. H. GAIRDNER.